United States Patent [19]
MacKarvich

[11] Patent Number: 6,041,666
[45] Date of Patent: *Mar. 28, 2000

[54] STRAP TENSION MEASUREMENT DEVICE

[76] Inventor: Charles J. MacKarvich, 1720 Tyler Green Trail, Smyrna, Ga. 30080

[ * ] Notice: This patent issued on a continued prosecution application filed under 37 CFR 1.53(d), and is subject to the twenty year patent term provisions of 35 U.S.C. 154(a)(2).

[21] Appl. No.: 09/004,486

[22] Filed: Jan. 8, 1998

[51] Int. Cl.[7] .................................................. G01L 1/26
[52] U.S. Cl. ........................................ 73/862.391; 73/828
[58] Field of Search ............................. 73/828, 862.391, 73/862.392, 862.42, 862.51

[56] References Cited

U.S. PATENT DOCUMENTS

| | | | |
|---|---|---|---|
| 1,289,066 | 12/1918 | Adams . | |
| 2,472,845 | 6/1949 | Neiswander | 73/862.391 |
| 3,366,299 | 1/1968 | Rose, Jr. et al. | 73/862.451 |
| 4,171,640 | 10/1979 | Van Mastright | 73/862.451 |
| 4,245,512 | 1/1981 | Saunders | 73/789 |
| 4,924,709 | 5/1990 | Plyter | 73/829 |
| 5,390,550 | 2/1995 | Miller | 73/862.391 |
| 5,461,929 | 10/1995 | Jordan | 73/862.393 |

*Primary Examiner*—Max Noori
*Attorney, Agent, or Firm*—Thomas, Kayden, Horstemeyer & Risley

[57] ABSTRACT

The present invention relates to a strap tension measurement device (10) that facilitates measuring of the tension in straps, especially straps that have been installed in a manufactured home stabilizing system. The device generally includes a body portion (12) and a strap engagement portion (14). The body portion is typically formed from thick metallic plate material such as steel plating and includes an elongated indicator portion (18) that is used to indicate to the operator the position at which the measurement is to be taken. The strap engagement portion includes upper (26) and lower (28) strap abutment members that together form a narrow slot (30) that is sized and shaped for receipt of a strap to be tested. The measurement device typically is used in conjunction with a force measurement tool, such as a conventional torque wrench, that connects to the strap tension measurement device at a connection aperture (16) formed in the body portion. The strap to be tested is inserted into the narrow slot and the tool rotated about its head in an upward direction until the tip of the indicator portion (22) aligns with the strap at which point a force measurement is taken. This force measurement, typically a torque measurement, is then checked against a tension correlation table or chart to determine the tension in the strap.

10 Claims, 3 Drawing Sheets

STRAP TENSION MEASUREMENT DEVICE

FIELD OF THE INVENTION

This invention relates generally to a device that can be used when measuring the tension in a thin strap or band. More particularly, the invention relates to a strap tension measurement device that can be used with a force measurement tool, such as a torque wrench, to measure the tension in tie straps of a manufactured home stabilization system.

BACKGROUND OF THE INVENTION

Manufactured homes, such as mobile homes, trailers, prefabricated houses, and the like are manufactured at a central manufacturing site and, upon completion, are moved to a location where they will be permanently located. Because the home is designed to be easily moved from the manufacturing site to the permanent location, it is not initially built upon a permanent foundation, but rather is constructed upon a pair of parallel I-beam joists. The manufactured home is then transported to the installation site where the home will be mounted upon piers formed from concrete blocks, pilings, or stabilizing jacks.

Since the manufactured home will, from time to time, be exposed to strong wind forces and/or geological phenomena such as ground tremors, it is important that the home be anchored in position on the piers. Typically, stabilization systems are used to secure the home in place and prevent the home from being shifted off of its piers by the forces to which it is subjected. In a common type of stabilization system, soil anchors having shafts with one or more helical plates at the bottom of the shafts are drilled into the ground until only their heads remain above ground. Cold rolled steel straps or bands are installed as diagonal ties that extend from each anchor head to the lower framework of the manufactured home. The straps or bands are tightened at the anchor head to take up the slack in the straps and to apply tension thereto so as to secure the home in place atop its piers.

When anchor and strap systems such as that described above are used, the straps must be loaded in an appropriate amount of tension. To ensure that the stabilizing system has been installed under the correct amount of force, the tension in each of the straps should be measured. The most common way to measure tension in a strap such as those used in these systems is with a strain gauge. In that providing each strap with its own strain gauge would be physically and economically impractical, alternative measurement means are needed. Accordingly, it can be appreciated that it would be desirable to have a device which permits simple measuring of the tension in the straps after the straps have been installed in the stabilization system.

SUMMARY OF THE INVENTION

The present invention relates to a strap tension measurement device that facilitates measuring of the tension in straps or bands, especially tie straps that have been installed in a manufactured home stabilization system. The device generally comprises a body portion and a strap engagement portion. The body portion is typically formed from thick metallic plate material such as steel plating. Formed in the body portion is a force measurement tool connecting aperture through which a force measurement tool can connect to the strap tension measurement device. This aperture is sized and shaped to receive a connector end of the force measurement tool. Also formed on the body portion is an elongated indicator portion that is used to indicate to the tool operator the position of the measurement device with respect to the strap at which the measurement is to be taken. In a preferred embodiment, the indicator portion extends longitudinally away from the connection aperture and includes a curved portion that ends in a pointed tip. Typically, the body portion is further provided with a strap thickness measurement slot which can be used to determine whether the proper size strap is being measured.

The strap engagement portion comprises opposed upper and lower strap abutment members. The members are similarly shaped and each has a planar side that opposes the planar side of the other abutment member to form between them a narrow slot that is sized and shaped for receipt of a strap to be tested. Formed on a side opposite the inner planar side of at least the upper abutment member is a tool cut-out area that is sized and shaped to accommodate the head of the force measurement tool. Preferably each abutment member is formed from a plurality of similarly shaped plate portions which are cut from metallic plate material similar to that used to form the body portion. Once cut, the plate portions are stacked to form relatively thick abutment members that extend away from the body portion. The plate portions are attached to each other and to the body portion with a plurality of conventional fasteners.

The measurement device is used in conjunction with a force measurement tool, typically as a conventional torque wrench, that connects to the strap tension measurement device at the connection aperture of the body portion. Once the tool is connected to the measurement device, the strap to be tested is inserted into the narrow slot with the full width of the strap being disposed therein. The tool is then articulated in an upward direction until the tip of the indicator portion of the tool aligns with the surface of the strap. At this point, the operator can read the measurement, typically a torque measurement, that can then be checked against a tension correlation table or chart to determine the tension in the strap.

Thus, it is an object of this invention to provide an improved device that is used to measure the tension in a strap.

Another object of this invention is to provide such a device that is used in conjunction with a conventional force measurement tool.

A further object of this invention is to provide such a device that is of simple design and low in cost.

Other objects, features and advantages of this invention will become apparent upon reading the following specification, when taken in conjunction with the accompanying drawings.

DETAILED DESCRIPTION

Figure 1:
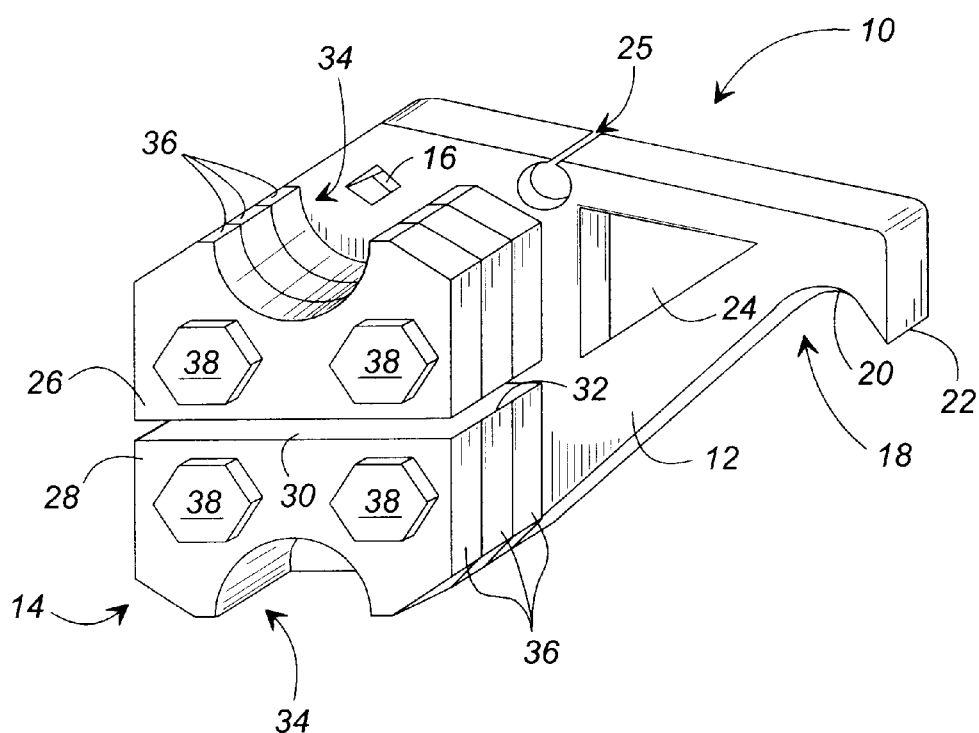
FIG. 1 is a front perspective view of the strap tension measurement device of the present invention.
Figure 2:
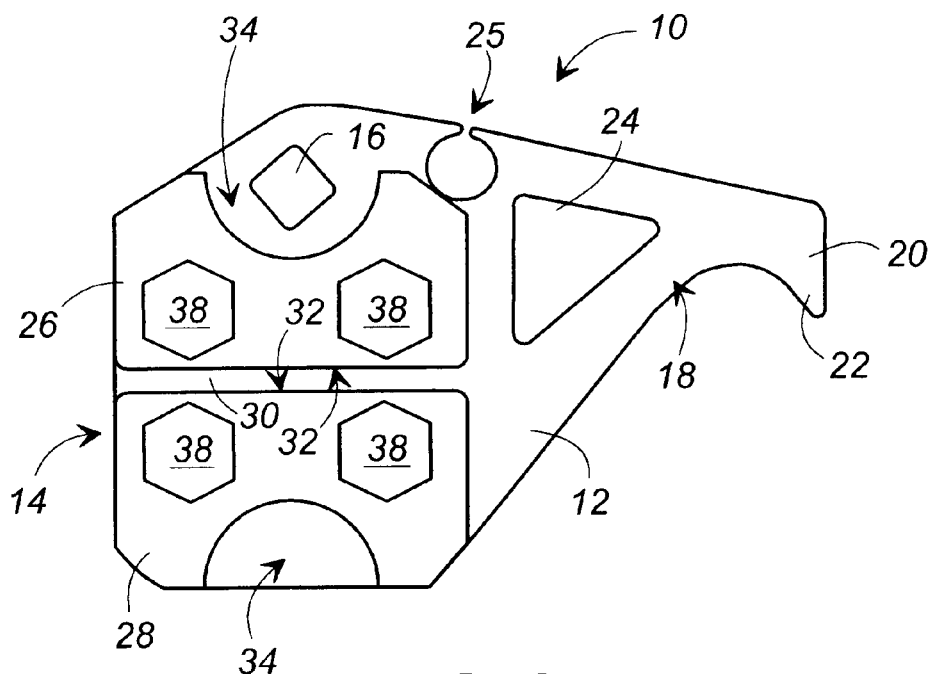
FIG. 2 is a is a front view of the strap tension measurement device.
Figure 3:
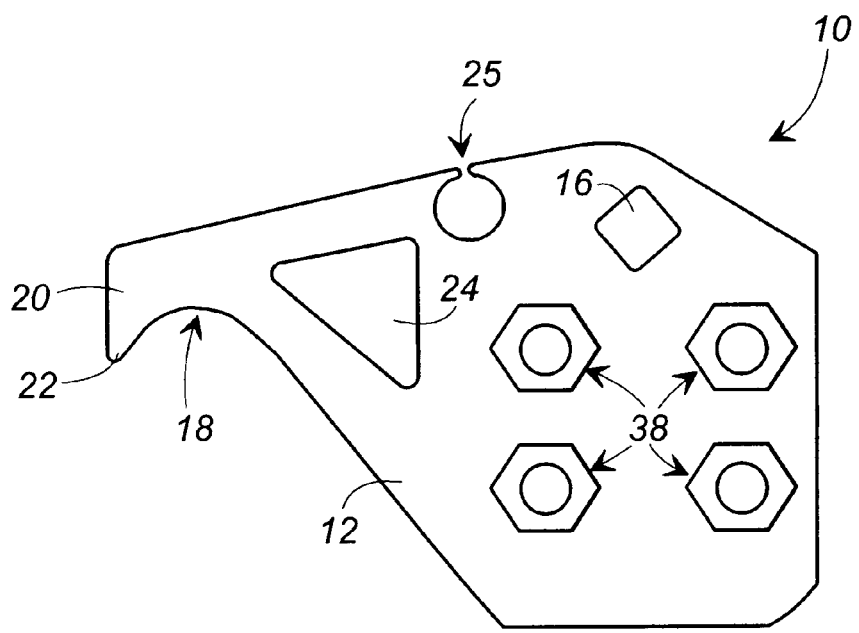
FIG. 3 is a rear view of the strap tension measurement device.

Referring now in more detail to the drawings, in which like numerals indicate like parts throughout the several views, FIGS. 1–3 illustrate the strap tension measurement device of the present invention.

As shown in these figures, the strap tension measurement device 10 generally comprises a body portion 12 and a strap engagement portion 14 that is connected to the body portion. For simplicity of manufacture, the body portion 12 is preferably formed from relatively thick metallic plate material. Due to the large forces to which the body portion will be subjected during use, the plate of metallic material is preferably made of a strong metal such as steel. Although described as being formed from steel plate material, it will be appreciated that the body portion could alternatively be formed through casting or be made of a different strong material.

Formed in the body portion 12 is a force measurement tool connecting aperture 16 through which a force measurement tool can connect to the strap tension measurement device 10. The aperture is sized and shaped to receive a connector end of the force measurement tool. Since many of these tools, including conventional torque wrenches, are provided with substantially square connector ends, the aperture 16 is substantially square in shape. It will be understood, however, that the aperture could be configured in alternative shapes to accommodate alternatively shaped connector ends.

Also formed on the body portion 12 is an elongated indicator portion 18, the purpose for which will be described in detail below. In a preferred configuration, the indicator portion 18 extends longitudinally away from the connection aperture 16 and generally forms the outline of a profile of a bird head. Accordingly, the indicator portion includes a curved portion 20 that ends in a pointed tip 22. Although not essential, a central aperture 24 can be provided within the indicator portion to conserve material and both reduce the weight of the strap tension measuring device.

In a preferred embodiment, the body portion is further provided with a strap thickness measurement slot 25. The measuring slot is formed to have a particular predetermined width, for example 0.039 inches. The device operator can use this measurement slot to ensure that the device is being used with the proper size strap. Specifically, the operator can try to fit the strap within the measurement slot. If the strap is too large to slide into the measurement slot, the operator then knows the strapping is too large and that thinner strapping should be used.

As mentioned above, the strap tension measurement device 10 also includes a strap engagement portion 14 that is connected to the body portion 12. In a preferred embodiment, the strap engagement portion 14 comprises upper and lower, or first and second, strap abutment members 26 and 28 (FIGS. 1–2). The abutment members 26 and 28 are similarly shaped with each member having an inner planar side 32 that forms part of a narrow slot 30 that is sized and shaped for receipt of a strap to be tested. As shown most clearly in FIG. 2, the narrow slot 30 extends in a direction generally parallel to the longitudinal extent of the indicator portion 20 of the body portion 12. Formed on a side opposite the inner planar side of at least the upper abutment member 26 is a tool cut-out area 34. This cut-out area is sized and shaped to accommodate receiving the head of the force measurement tool. Typically, the cut-out area 24 forms the shape of a semi-circle having a central axis common with the central axis of the tool connecting aperture 16.

To simplify manufacture and reduce cost, each abutment member 26 and 28 typically comprises a plurality of similarly shaped plate portions 36 (FIG. 1). These plate portions can be cut or stamped from metallic plate material similar to that used to form the body portion 12. Once formed, the plate portions can be stacked to form relatively tall abutment members that, when attached to the body portion, extend away from the body portion. The number of plate portions used is dependent upon the thickness of the straps to be tested. Typically, three plate portions are used such that the full width of the strap can fit within the narrow slot 30 and each abutment member is approximately three times as thick as the body portion. However, it will be understood that fewer or more than three plate portions could be used, if desired. Moreover, persons having ordinary skill in the art will appreciate that each abutment member could be formed by casting instead of cutting or stamping.

In embodiments in which plate portions are used to form the abutment members 26 and 28, the plate portions 36 are attached to each other and to the body portion 12 with a plurality of bolt fasteners 38. Alternatively, other conventional fasteners as well as other conventional means of attachment, could be used to secure the plates and the body member together. To simplify production, each plate portion is substantially identical in size and shape. Accordingly, the lower abutment member 28 typically will also include a tool cut-out area 34.

Figure 4:
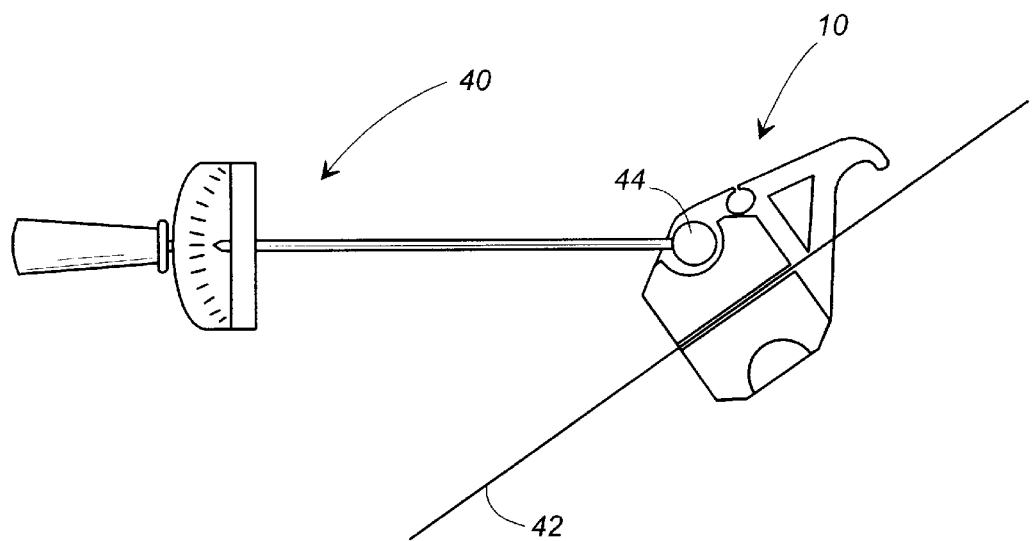
FIG. 4 is a front view of the strap tension measurement device being used with a conventional torque wrench to measure the tension in a strap to be tested.
Figure 5:
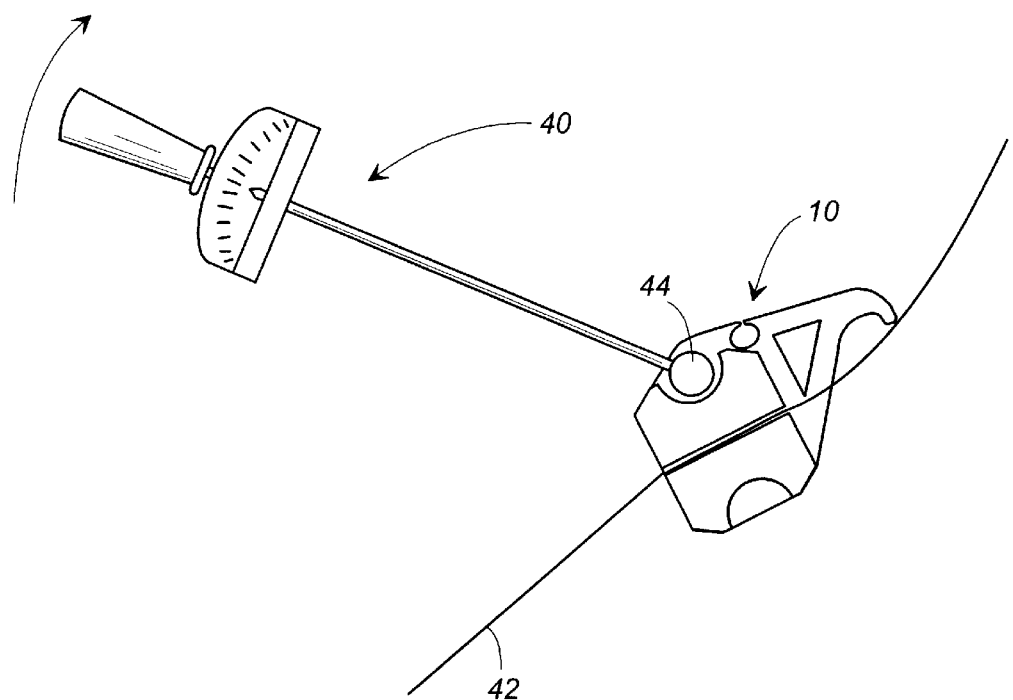
FIG. 5 is a front view showing the strap tension measurement device and torque wrench of FIG. 4 shown articulated to the measurement point.

To measure the tension in a selected strap, the measurement device 10 of the present invention is used in conjunction With a force measurement device. Typically, a conventional torque wrench 40 is used and is connected to the strap tension measurement device 10 with its connector end (not shown) in the connection aperture 16 of the body portion 12 (FIG. 4). Once the torque wrench is connected to the measurement device, the strap engagement portion 14 is placed about the strap 42 with the full width of the strap being disposed within the narrow slot 30. So arranged, the torque wrench is then rotated about its head 44 in an upward direction as noted by the directional arrow in FIG. 5. Rotation is continued until the tip 22 of the indicator portion 18 aligns with the strap 42 as indicated in FIG. 5. It is to be noted that the tip typically will not contact the strap since it is laterally offset from the strap when the device is used correctly. Note further that, as illustrated in FIG. 5, the strap is temporarily deformed during the measurement process. While in this orientation, the operator can read the torque measurement, or other force reading if an alternative tool is used. This measurement reading can then be checked against a tension correlation table or chart which pertains to the particular strap being tested to determine the amount of tension in the strap.

While preferred embodiments of the invention have been disclosed in detail in the foregoing description and drawings, it will be understood by those skilled in the art that variations and modifications thereof can be made without departing from the spirit and scope of the invention as set forth in the following claims. For instance, although the device has been described as being composed of separate parts connected with fasteners, it will be appreciated that the entire device or portions thereof could be formed unitarily.

What is claimed is:

1. A strap tension measurement device, comprising:
  a strap engagement portion having a narrow slot that is sized and shaped to receive a thin strap whose tension is to be measured; and
  a body portion connected to said strap engagement portion, said body portion having a force measurement tool connection aperture, and an integrally fixed elongated indicator portion that extends away from said strap engagement portion, said elongated indicator portion being adapted so as to be positioned directly adjacent the thin strap when the strap tension is to be measured to indicate when to read the measurement from the force measurement tool;

wherein when the thin strap is inserted in said narrow slot and the force measurement tool is connected to said body portion at said tool connection aperture, the tension in the thin strap is measured with the force measurement tool when said device is manipulated such that the thin strap is deformed until said elongated indicator portion is positioned directly adjacent the thin strap.

2. The strap tension measurement device of claim 1, wherein said body portion is formed from a rigid plate material.

3. The strap tension measurement device of claim 1, wherein said force measurement tool connecting aperture is substantially square.

4. The strap tension measurement device of claim 1, wherein said body portion further includes a strap thickness measurement slot for estimating the thickness of the strap that is being tested.

5. The strap tension measurement device of claim 1, wherein the strap engagement portion comprises two opposed strap abutment members, wherein said abutment members together define said narrow slot.

6. The strap tension measurement device of claim 5, wherein at least one of said strap abutment members includes a tool cut-out area adjacent said measurement tool connection aperture of said body portion, said cut-out area being sized and shaped to facilitate connection of the measurement tool to said body portion at said connection aperture.

7. The strap tension measurement device of claim 6, wherein each of said strap abutment members is formed of a plurality of similarly shaped rigid plate portions that are secured to each other and to said body portion.

8. The strap tension measurement device of claim 7, wherein said plate portions are secured to each other and to said body portion with a plurality of bolt fasteners.

9. The strap tension measurement device of claim 1, wherein said elongated indicator portion includes a curved portion that ends in a pointed tip.

10. A strap tension measurement device, comprising:

a strap engagement portion having a narrow slot that is sized and shaped to receive a thin strap whose tension is to be measured; and a body portion connected to said strap engagement portion, said body portion having a force measurement tool connector and an integrally fixed indicator portion that extends away beyond the extent of said narrow slot, said elongated indicator portion being adapted so as to be positioned directly adjacent the thin strap when the strap tension is to be measured to indicate when to read the measurement from the force measurement tool;

wherein when the thin strap is inserted in said narrow slot and the force measurement tool is connected to said body portion at said tool connector, the tension in the thin strap is measured with the force measurement tool when said device is manipulated such that the thin strap is deformed until said indicator portion is positioned directly adjacent the thin strap.

\* \* \* \* \*